(12) United States Patent
Wu

(10) Patent No.: US 11,781,749 B2
(45) Date of Patent: Oct. 10, 2023

(54) FURNACE USING BIOMASS PELLETS AS FUEL

(71) Applicants: Qingdao Genjoy Home Fashion Co., Ltd., Shandong (CN); QSTOVES INC., Sammamish, WA (US)

(72) Inventor: Xiaohui Wu, Shandong (CN)

(73) Assignees: Qingdao Genjoy Home Fashion Co., Ltd., Shandong (CN); QSTOVES INC., Sammamish, WA (US)

(*) Notice: Subject to any disclaimer, the term of this patent is extended or adjusted under 35 U.S.C. 154(b) by 367 days.

(21) Appl. No.: 17/143,692

(22) Filed: Jan. 7, 2021

(65) Prior Publication Data

US 2021/0222876 A1    Jul. 22, 2021

(30) Foreign Application Priority Data

Jan. 21, 2020   (CN) .......................... 202020139587.5

(51) Int. Cl.
| | |
|---|---|
| *F23L 7/00* | (2006.01) |
| *F24B 5/02* | (2006.01) |
| *F24B 7/02* | (2006.01) |
| *F24B 7/04* | (2006.01) |
| *F24B 13/02* | (2006.01) |
| *F24D 5/00* | (2022.01) |

(52) U.S. Cl.
CPC ................ *F23L 7/007* (2013.01); *F24B 5/02* (2013.01); *F24B 7/02* (2013.01); *F24B 7/04* (2013.01); *F24B 13/02* (2013.01); *F24D 5/00* (2013.01); *F23L 2900/07006* (2013.01)

(58) Field of Classification Search
CPC ..... F23L 7/007; F24B 5/02; F24B 7/02; F24B 7/04; F24B 13/02; F24D 5/00
See application file for complete search history.

(56) References Cited

U.S. PATENT DOCUMENTS

| | | | | |
|---|---|---|---|---|
| 91,231 | A * | 6/1869 | Hepburn et al. .......... | F24B 7/04 126/72 |
| 4,304,215 | A * | 12/1981 | Jarman .................... | F24B 1/181 126/531 |
| 4,361,131 | A * | 11/1982 | Homolik ................. | F24B 7/025 126/61 |
| 4,607,612 | A * | 8/1986 | DeRisi .................. | F24B 1/1902 126/525 |
| 5,265,587 | A * | 11/1993 | Carlson .................. | F24B 13/02 110/282 |
| 2008/0025886 | A1* | 1/2008 | Manabe .................. | F23D 91/02 422/221 |
| 2016/0377297 | A1* | 12/2016 | Shin ......................... | F24H 6/00 126/68 |
| 2018/0340690 | A1* | 11/2018 | Zhang ...................... | F24B 1/16 |

* cited by examiner

*Primary Examiner* — David J Laux

(74) *Attorney, Agent, or Firm* — Young Basile Hanlon & MacFarlane, P.C.

(57) ABSTRACT

A furnace using biomass pellets as fuel, comprising a housing arranged on a base, wherein the housing is internally provided with a burning chamber, the bottom of which is provided with a burning grate, and the burning chamber is connected with a primary oxygen supply device; the primary oxygen supply device comprises an oxygen supply cylinder that communicates with the outside, and the bottom end of the oxygen supply cylinder is connected with an oxygen supply pipe II configured to blow air over the burning grate, and a plurality of air outlet holes I is defined in the oxygen supply cylinder.

15 Claims, 4 Drawing Sheets

FURNACE USING BIOMASS PELLETS AS FUEL

CROSS-REFERENCE TO RELATED APPLICATION

This application claims priority to Chinese Application No. 202020139587.5, filed on Jan. 21, 2020, the entire disclosure of which is hereby incorporated by reference.

TECHNICAL FIELD

The present disclosure relates to the technical field of furnaces, in particular to a furnace using biomass pellets as fuel.

BACKGROUND

According to fuel sources, furnaces for heating in the current market are distinguished into coal/char fired furnace, wood fired furnace, natural gas/liquefied gas fired furnace, and biomass pellets fired furnace.

The coal/char fired furnace has gradually become obsolete due to severe pollution when the coal/char burns. The wood fired furnace has the disadvantages of time and energy waste and short burning time. The natural gas/liquefied gas fired furnace has a high fuel cost due to the fact that the natural gas/liquefied gas as fuel belongs to fossil fuels. The biomass pellets fired furnace uses biomass pellets as fuel, which are made from biological straws, saw dust and wood dust and belong to renewable resources (waste utilization). It is environmental friendly, clean and economic and thus has been gradually accepted by consumers and its market is expanding.

For the furnace using biomass pellets as fuel in the current market, insufficient burning of the fuel is easily caused by insufficient oxygen supply. In order to increase oxygen supply, an electric fan is generally applied to air supply and exhaust, but cannot operate normally under power cut or without power supply. Heat from the furnace using biomass pellets as fuel in the current market is mainly dissipated by means of radiation, with a slow heat transmission speed and a close heat transmission distance. Moreover, the current furnace using the biomass pellets as fuel has a high use and maintenance cost, for instance, the biomass pellets are often fed to a hearth through a spiral feeder/auger or other electric delivery equipment in general.

SUMMARY

Implementations of this disclosure include, for example, a furnace using biomass pellets as fuel, comprising a housing arranged on a base, wherein the housing is internally provided with a burning chamber, the bottom of which is provided with a burning grate, and the burning chamber is fixedly connected with a primary oxygen supply device; the primary oxygen supply device comprises an oxygen supply cylinder that communicates with the outside, the bottom end of the oxygen supply cylinder is connected with an oxygen supply pipe II configured to blow air over the burning grate, and a plurality of air outlet holes I are defined in the oxygen supply cylinder. With the technical solution, after the fuel on the burning grate is ignited, oxygen in the burning chamber is consumed, pressure is reduced to form a pressure difference, and then the outside air is conveyed to the burning chamber via the oxygen supply cylinder and the oxygen supply pipe II to provide the burning with oxygen; the oxygen supply pipe II can blow air over the burning grate centrally to aim at a burning point of the fuel to realize more concentrated burning and stronger fire. When a flame rises to reach the oxygen supply cylinder, the oxygen supply cylinder supplies more oxygen for fuel burning via the air outlet holes I to realize more sufficient fuel burning with stronger fire due to large volume of the oxygen supply cylinder and increasing oxygen storage.

Preferably, one end of the oxygen supply cylinder communicates with the outside via the oxygen supply pipe I.

Preferably, the burning chamber is also fixedly connected with a secondary oxygen supply device; the secondary oxygen supply device comprises oxygen supply pipes III arranged above the burning chamber, the oxygen supply pipes III communicate with the outside, and a plurality of air outlet holes II is defined in the oxygen supply pipes III. With the technical solution, after the primary burning of the fuel, there is part of unburnt exhaust gas, carbon particles, etc. When they rise to the upper part of the burning chamber, the oxygen supply pipes III provide additional oxygen via the air outlet holes II to burn the unburnt exhaust gas, carbon particles and other substances again to form secondary burning to realize more sufficient burning and lower emission, thereby achieving a clean and environmental protection purpose.

Preferably, the burning chamber is internally provided with vent pipes, both ends of which communicate with the outside. With the technical solution, the furnace not only dissipates heat by means of radiation, but also heats the air to realize circulation and convection thereof, thereby increasing heat transmission speed and scope.

Preferably, the vent pipes comprise a vent pipe I, one end of the vent pipe I penetrates through the bottom end of the burning chamber to communicate with the outside, and the other end thereof penetrates the upper end of a side wall of the burning chamber to connect with one end of a heat output channel, and the other end of the heat output channel extends to the upper part of the housing and communicates with the outside; With this technical solution, temperature within the burning chamber rises as fuel burns. The vent pipe I is heated at uneven heating temperature. On account that air current is caused by the uneven temperature, air flows to a part at a higher temperature from a part at a lower temperature of the vent pipe I, so as to form circulation and convection. Circulation and convection of air in the upper and lower parts of the furnace are increased by aerodynamics, so that not only furnace heat is dissipated by means of radiation, but also the air is heated to realize circulation and convection thereof, so that the heat from the furnace is transmitted to a further place at the upper part of the furnace.

Preferably, the vent pipe further comprises a vent pipe II, one end of the vent pipe II penetrates through the bottom end of the burning chamber to communicate with the outside, and the other end thereof penetrates through the upper end of a side wall of the burning chamber to communicate with the outside. With this technical solution, temperature within the burning chamber rises as fuel burns. The vent pipe II is heated with uneven heating temperature. On account that air current is caused by the uneven temperature, air flows to a part at a higher temperature from a part at a lower temperature of the vent pipe II, so as to form circulation and convection. Circulation and convection of air around the furnace are increased by aerodynamics, so that not only furnace heat is dissipated by means of radiation, but also the air is heated to realize circulation and convection thereof, so that heat from the furnace is transmitted to a further place around the furnace.

Preferably, an interval is arranged between the housing and the burning chamber, and heat output holes are defined in the housing. With the technical solution, people can be prevented from directly touching a surface of the burning chamber, in order to avoid getting burned; air heated by the burning chamber can be dissipated to heat an external environment via the heat output holes, which will not affect the heat output of the furnace.

Preferably, one side of the burning chamber is provided with a heating chamber, an oven is arranged in the heating chamber, and one side of the heating chamber is connected with a chimney.

Preferably, the heat output channel is fixedly connected with the oven.

Preferably, a heating interlayer is arranged between the heating chamber and the oven, and the burning chamber communicates with the heating interlayer, and the heating interlayer communicates with the chimney. With the technical solution, high temperature exhaust gas from the burning chamber enters the heating interlayer to enclose and heat the oven, thereby being capable of baking food in the oven. Lastly, the high temperature exhaust gas is exhausted from the chimney.

Preferably, one side of the burning chamber is provided with a burning chamber door, a high-temperature resistant glass is embedded on the burning chamber door, and the burning chamber door is further provided with a burning chamber door handle. With the technical solution, the burning chamber door is embedded with the high-temperature resistant glass, through which people can observe the fuel burning condition.

Preferably, one side of the heating chamber is provided with a heating chamber door, a high-temperature resistant glass is embedded on the heating chamber door, and the heating chamber door is further provided with a heating chamber door handle. With this technical solution, the heating chamber door handle is provided to take and put food from the oven. The heating chamber door is embedded with the high-temperature resistant glass, through which people can observe the process of cooking.

Preferably, an ash tray is arranged below the burning grate connected with a shaking rod, one end of the shaking rod protrudes out of the housing, and the burning grate is provided with a plurality of holes. With this technical solution, the burning grate can displace forwards and backwards slightly by moving the shaking rod back and forth, so that the fuel on the burning grate will accelerate to fall into the ash tray, which can burn the fuel stronger quickly with wider flame. The ash tray plays a role in collecting ashes to prevent the ashes from falling to the ground for cleaning up. Moreover, plant ash from the burned biomass pellets is a good organic fertilizer.

Preferably an inner upper part of the housing is provided with a storage hopper, and the storage hopper communicates with the burning chamber through an inclined feed tube. With this technical solution, the fuel in the storage hopper slides to the burning chamber via the feed tube under an action of gravity.

Preferably, the burning chamber is internally provided with a burning compartment, the bottom of which communicates with the burning grate. With this technical solution, the fuel in the storage hopper falls into the burning compartment for burning from the feed tube. The fuel accumulated centrally will not be scattered to all bottom corners of the burning chamber, and the oxygen supply pipe II can supply oxygen to the fuel in the burning compartment fully, so that the fuel burns fully. After the biomass pellets burnt on the burning grate get smaller, and fall through the burning grate, the biomass pellets in the storage hopper will slide to the burning compartment along the inclined feed tube continuously, allowing the furnace to burn consistently and unremittingly under an action of gravity.

The furnace according to the present disclosure can be used as well under power cut or without power supply by virtue of methods of natural ventilation and the gravity fed. The furnace is easy and convenient to maintain and low in cost. With the biomass pellets as fuel, the primary and secondary burning oxygen supply devices are designed to realize less emission and more environmental protection. The oven is arranged to more effectively use the heat, so that multiple purposes, including cooking and processing food, can be realized while heating.

Figure 1:
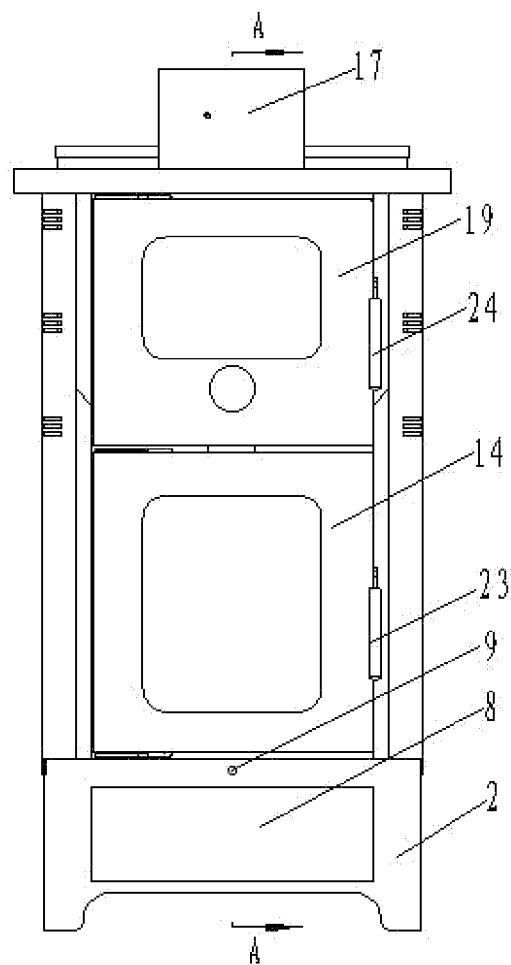
FIG. 1 is a structural front view of the present disclosure.
Figure 2:
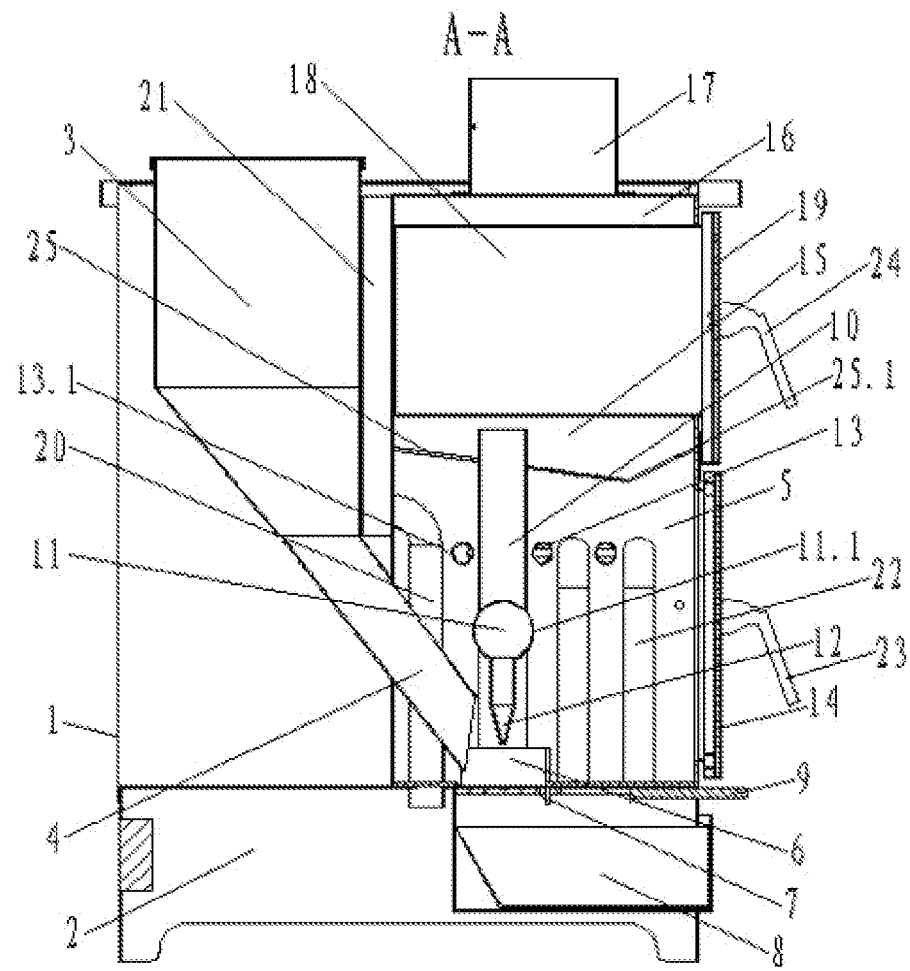
FIG. 2 is a structural sectional view A-A in FIG. 1.
Figure 3:
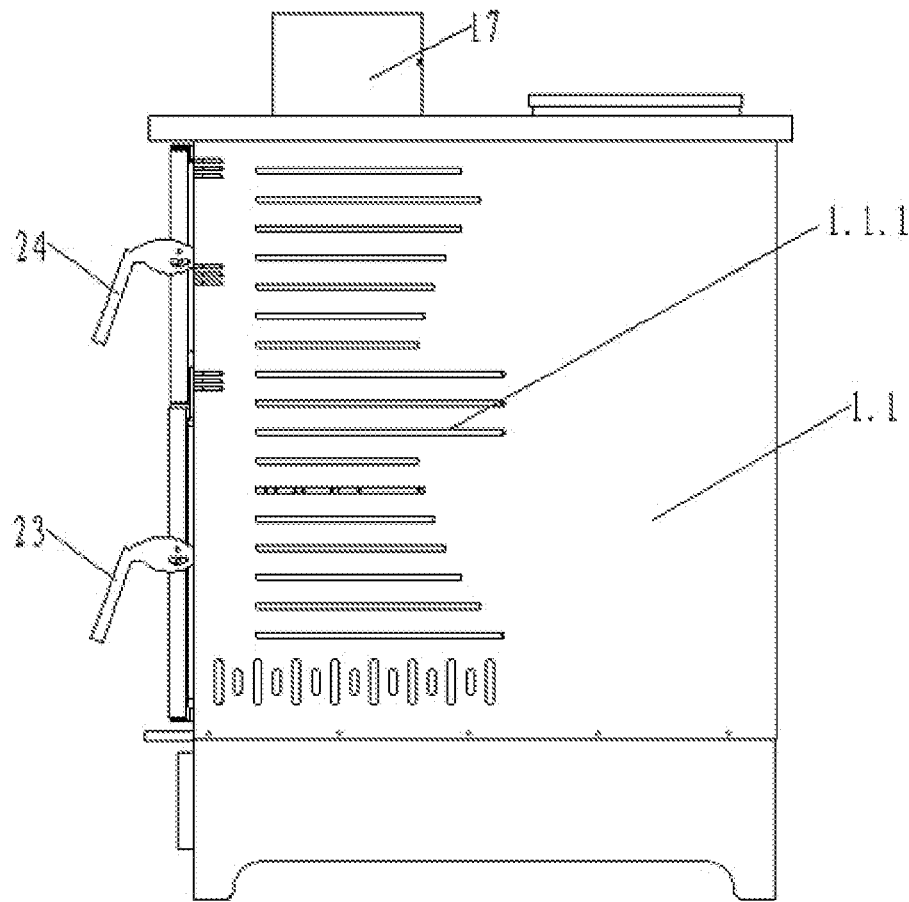
FIG. 3 is a structural right view of the present disclosure.
Figure 4:
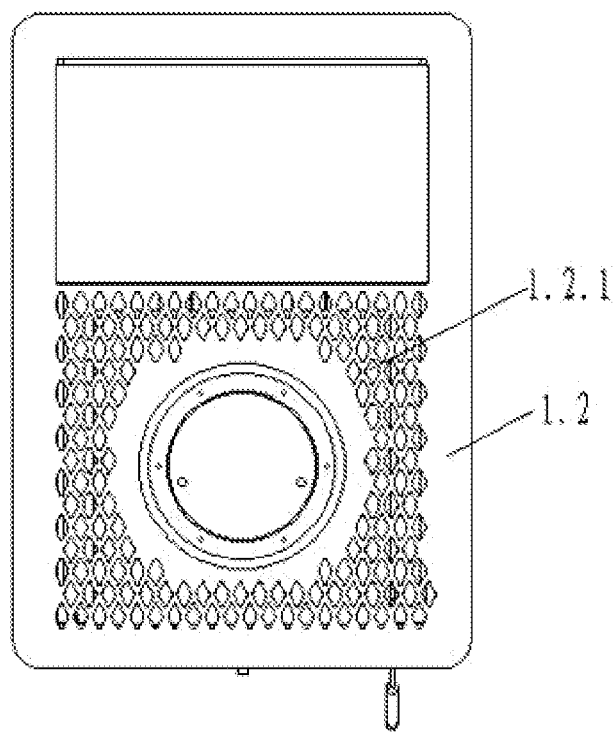
FIG. 4 is a structural top view of the present disclosure.
Figure 5:
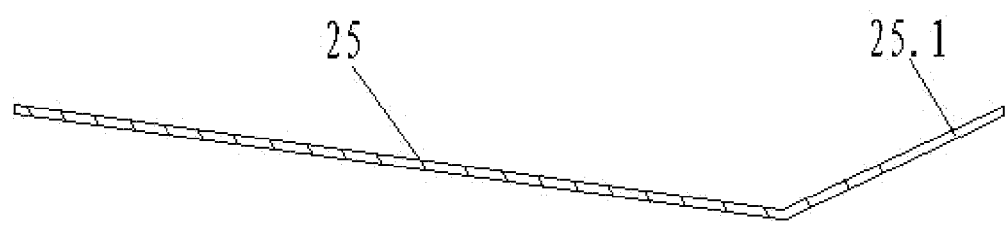
FIG. 5 is a structural sectional view of a separator plate.

In which: 1—housing, 1.1—side plate, 1.1.1—heat output hole I, 1.2—top plate, 2.1—heat output hole II, 2—base, 3—storage hopper, 4—feed tube, 5—burning chamber, 6—burning compartment, 7—burning grate, 8—ash tray, 9—shaking rod, 10—oxygen supply pipe I, 11—oxygen supply cylinder, 11.1—air outlet hole I, 12—oxygen supply pipe II, 13—oxygen supply pipe III, 13.1—air outlet hole II, 14—burning chamber door, 15—heating chamber, 16—heating interlayer, 17—chimney, 18—oven, 19—heating chamber door, 20—vent pipe I, 21—heat output channel, 22—vent pipe II, 23—burning chamber door handle, 24—heating chamber door handle, 25—separator plate, 25.1—through hole.

DETAILED DESCRIPTION

To clearly describe the technical features of this solution, the solution will be expounded in detail as below by reference to the specific implementations and the figures.

As shown in Figures, a furnace using biomass pellets as fuel, comprising a housing 1 on a base 2, wherein the housing 1 is internally provided with a furnace body; the furnace body is divided into a burning chamber 5 and a heating chamber 15 by a separator plate 25, the heating chamber 15 is arranged above the burning chamber 5, and the separator plate 25 is provided with through holes 25.1; exhaust gas from the burning chamber 5 can enter the heating chamber 15 via the through holes 25.1, the bottom of the burning chamber 5 is provided with a burning grate 7, and the burning chamber 5 is fixedly connected with a primary oxygen supply device; the primary oxygen supply device comprises an oxygen supply cylinder 11 that communicates with the outside via an oxygen supply pipe I 10, the bottom end of the oxygen supply cylinder 11 is connected with an oxygen supply pipe II 12 configured to blow air above the burning grate 7, and the oxygen supply cylinder 11 is provided with air outlet holes I 11.1 and is fixedly connected with an inner wall of the burning chamber 5. After the fuel on the burning grate 7 is ignited, oxygen in the burning chamber 5 is consumed, pressure is reduced to form a pressure difference, and the outside air is conveyed to the burning chamber 5 via the oxygen supply cylinder 11 and the oxygen supply pipe II 12 to provide the burning with oxygen; the oxygen supply pipe II 12 can blow air over the burning grate 7 centrally to aim at a burning point of the fuel to realize more concentrated burning and stronger fire. When a flame rises to reach the oxygen supply cylinder 11, the oxygen supply cylinder 11 supplies more oxygen for fuel burning via the air outlet holes I 11.1 to realize more sufficient fuel burning with stronger fire due to large volume of the oxygen supply cylinder 11 and increasing oxygen storage.

The burning chamber 5 is further fixedly connected with a secondary oxygen supply device; the secondary oxygen supply device comprises oxygen supply pipes III 13 arranged above the burning chamber 5, the oxygen supply pipes III 13 communicates with the outside, and air outlet holes II 13.1 is defined in the oxygen supply pipes III 13. After the primary burning of the fuel, there is unburnt exhaust gas, carbon particles, etc. When they rise to the upper part of the burning chamber 5, the oxygen supply pipes III 13 provide additional oxygen via the air outlet holes II 13.1. The unburnt exhaust gas, carbon particles and other substances are burnt again to form secondary burning to realize more sufficient burning and lower emission, thereby achieving a clean and environmental protection purpose.

Preferably, the burning chamber 5 is internally provided with a vent pipe, both ends of which communicate with the outside. The vent pipe comprises a vent pipe I 20, one end of the vent pipe I 20 penetrates through the bottom end of the burning chamber 5 to communicate with the outside, and the other end thereof penetrates the upper end of a side wall of the burning chamber 5 to connect with one end of a heat output channel 21, and the other end of the heat output channel 21 extends to the upper part of the housing and communicates with the outside. Temperature within the burning chamber 5 rises as fuel burns. The vent pipe I 20 is heated with uneven heating temperature. On account that air current is caused by the uneven temperature, air flows to a part at a higher temperature from a part at a lower temperature of the vent pipe I 20, so as to form circulation and convection. Circulation and convection of air in the upper and lower parts of the furnace are increased by aerodynamics, so that not only furnace heat is dissipated by means of radiation, but also the air is heated to realize circulation and convection thereof, so that heat from the furnace is transmitted to a further place at the upper part of the furnace. The vent pipe further comprises a vent pipe II, one end of the vent pipe II penetrates through the bottom end of the burning chamber to communicate with the outside, and the other end of the vent pipe II penetrates through the upper end of a side wall of the burning chamber to communicate with the outside. Temperature within the burning chamber rises as fuel burns. The vent pipe II is heated with uneven heating temperature. On account that air current is caused by the uneven temperature, air flows to a part at a higher temperature from a part at a lower temperature of the vent pipe II, so as to form circulation and convection. Circulation and convection of air around the furnace are increased by aerodynamics, so that not only furnace heat is dissipated by means of radiation, but also air is heated to realize circulation and convection thereof, so that heat from the furnace is transmitted to a further place around the furnace.

An interval is arranged between the housing 1 and the burning chamber 5 or between the housing 1 and the furnace body, which can prevent people from directly touching a surface of the burning chamber 5 and avoid burn. The heat output holes comprise heat output holes I 1.1.1 in a side plate 1.1 and a heat output holes II 1.2.1 in a top plate 1.2. The heat output holes are defined in the housing 1. Air heated by the burning chamber can be dissipated to heat an external environment via the heat output holes, which will not affect the heat output of the furnace.

The heating chamber 15 is further internally provided with an oven 18, one side of the heating chamber 15 is connected with a chimney 17, and the heat output channel 21 is fixedly connected with an oven 18. A heating interlayer 16 is arranged between the heating chamber 15 and the oven, and the burning chamber 5 communicates with the heating interlayer 16, and the heating interlayer 16 communicates with the chimney 17. High temperature exhaust gas from the burning chamber 5 enters the heating interlayer 16 to enclose and heat the oven 18, thereby being capable of baking food in the oven 18. Lastly, the high temperature exhaust gas is exhausted from the chimney 17.

Preferably, one side of the burning chamber 5 is provided with a burning chamber door 14, a high-temperature resistant glass is embedded on the burning chamber door 14, and the burning chamber door 14 is further provided with a burning chamber door handle 23. One side of the heating chamber 15 is provided with a heating chamber door 19, a high-temperature resistant glass is embedded on the heating chamber door 19, and the heating chamber door 19 is further provided with a heating chamber door handle 24.

An ash tray 8 is arranged below the burning grate 7 connected with a shaking rod 9, one end of the shaking rod 9 protrudes out of the housing 1, and the burning grate 7 is provided with a plurality of holes. The burning grate 7 can displace forwards and backwards slightly by moving the shaking rod 9 back and forth, so that the fuel on the burning grate 7 will accelerate to fall into the ash tray 8, which can burn the fuel stronger quickly with wider flame. The ash tray 8 plays a role in collecting ashes to prevent the ashes from falling to the ground for cleaning up. Moreover, plant ash from the burned biomass pellets is a good organic fertilizer.

An inner upper part of the housing 1 is provided with a storage hopper 3, and the storage hopper 3 communicates with the burning chamber 5 through an inclined feed tube 4, and the fuel in the storage hopper 3 slides to the burning chamber 5 via the feed tube 4 under an action of gravity. The burning chamber 5 is internally provided with the burning compartment 6, and the burning grate 7 is located at the bottom of the burning compartment 6; the fuel in the storage hopper 3 falls into the burning compartment 6 for burning from the feed tube 4. The fuel accumulated centrally will not be scattered to all bottom corners of the burning chamber 5, and the oxygen supply pipe II 12 can supply oxygen to the fuel in the burning compartment 6 fully, so that the fuel burns fully. After the biomass pellets burnt on the burning grate 7 get smaller, and fall through the burning grate 7, the biomass pellets in the storage hopper 3 will slide to the burning compartment 6 along the inclined feed tube 4 continuously, allowing the furnace to burn consistently and unremittingly under an action of gravity.

The furnace according to the present disclosure can be used as well under power cut or without power supply by virtue of methods of natural ventilation and gravity fed. The furnace is easy and convenient to maintain and low in cost. With the biomass pellets as fuel, the primary and secondary burning oxygen supply devices are designed to realize less emission and more environmental protection. The oven 18 is arranged to more effectively use the heat, so that multiple purposes, including cooking and processing food, can be realized while heating.

Technical features not described in the present disclosure can be implemented by or with the prior art, which are not repeated in detail herein. Certainly, the foregoing description does not limit the present disclosure, and is not limited to the foregoing implementations. Change, modification, addition or replacement made by those of ordinary skill in the art within the substantive scope of the present utility should also belong to the protection scope of the present disclosure.

What is claimed is:

1. A furnace using biomass pellets as fuel, comprising:
a housing arranged on a base, wherein the housing is internally provided with a burning chamber, a bottom end of the burning chamber is provided with a burning grate, and the burning chamber is fixedly connected with a primary oxygen supply device,
wherein the primary oxygen supply device comprises an oxygen supply cylinder that communicates with atmospheric air, a bottom end of the oxygen supply cylinder is connected with a first oxygen supply pipe configured to blow air over the burning grate, and a first air outlet is defined in the oxygen supply cylinder,
wherein the burning chamber includes a first vent pipe, the first vent pipe including:
a first end that penetrates through the bottom end of the burning chamber and is in communication with the atmospheric air, and
a second end that penetrates through an upper end of a side wall of the burning chamber and is in communication with the atmospheric air.

2. The furnace according to claim 1, wherein one end of the oxygen supply cylinder communicates with the atmospheric air through a second oxygen supply pipe.

3. The furnace according to claim 1, wherein the burning chamber is further fixedly connected with a secondary oxygen supply device,
wherein the secondary oxygen supply device comprises a third oxygen supply pipe arranged at an upper part of the burning chamber, the third oxygen supply pipe communicates with the atmospheric air, and a second air outlet is defined in the third oxygen supply pipe.

4. The furnace according to claim 1, wherein the
second end of the first vent pipe connects with one end of a heat output channel, and the other end of the heat output channel extends to an upper part of the housing and communicates with the atmospheric air.

5. The furnace according to claim 4, wherein one side of the burning chamber is provided with a heating chamber, an oven is arranged in the heating chamber, and an additional side of the heating chamber is connected with a chimney.

6. The furnace according to claim 5, wherein an interval is arranged between the housing and the burning chamber, and heat output holes are defined in the housing.

7. The furnace according to claim 6, wherein a heating interlayer is arranged between the heating chamber and the oven, and the burning chamber communicates with the heating interlayer, and the heating interlayer communicates with the chimney.

8. The furnace according to claim 6, wherein one side of the burning chamber is provided with a burning chamber door, a high-temperature resistant glass is embedded on the burning chamber door, and the burning chamber door is further provided with a burning chamber door handle.

9. The furnace according to claim 6, wherein one side of the heating chamber is provided with a heating chamber door, a high-temperature resistant glass is embedded on the heating chamber door, and the heating chamber door is further provided with a heating chamber door handle.

10. The furnace according to claim 6, wherein the heat output channel is fixedly connected with the oven.

11. The furnace according to claim 1, wherein an ash tray is arranged below the burning grate connected with a shaking rod, wherein one end of the shaking rod protrudes out of the housing, and the burning grate is provided with a plurality of holes.

12. The furnace according to claim 1, wherein an inner upper part of the housing is provided with a storage hopper, and the storage hopper communicates with the burning chamber through an inclined feed tube.

13. The furnace according to claim 1, wherein the burning chamber is internally provided with a burning compartment, and the burning grate is arranged at a bottom of the burning compartment.

14. The furnace according to claim 1, wherein a temperature of the first vent pipe rises as the temperature within the burning chamber rises, and the rising temperature of the first vent pipe causes the atmospheric air to flow from the first end to the second end.

15. The furnace according to claim 1, further comprising a second vent pipe including:
a first end that penetrates through the bottom end of the burning chamber and is in communication with the atmospheric air, and
a second end that penetrates through the upper end of the side wall of the burning chamber and is in communication with the atmospheric air, wherein a temperature of the second vent pipe rises as the temperature within the burning chamber rises, and the rising temperature of the second vent pipe causes the atmospheric air to flow from the first end to the second end.

* * * * *